US012627066B2

(12) United States Patent
Crouch et al.

(10) Patent No.: US 12,627,066 B2
(45) Date of Patent: May 12, 2026

(54) DIELECTRIC ENCAPSULATED METAL LENS

(71) Applicant: RAYTHEON COMPANY, Waltham, MA (US)

(72) Inventors: David D. Crouch, Farragut, TN (US); Hooman Kazemi, Thousand Oaks, CA (US)

(73) Assignee: Raytheon Company, Arlington, VA (US)

( * ) Notice: Subject to any disclaimer, the term of this patent is extended or adjusted under 35 U.S.C. 154(b) by 194 days.

(21) Appl. No.: 18/106,817

(22) Filed: Feb. 7, 2023

(65) Prior Publication Data

US 2023/0198158 A1 Jun. 22, 2023

Related U.S. Application Data

(63) Continuation-in-part of application No. 17/524,644, filed on Nov. 11, 2021, now Pat. No. 11,870,148.

(51) Int. Cl.
*H01Q 15/10* (2006.01)

(52) U.S. Cl.
CPC .................................... *H01Q 15/10* (2013.01)

(58) Field of Classification Search
CPC ......... H01Q 19/065; H01Q 1/38; H01Q 15/04
See application file for complete search history.

(56) References Cited

U.S. PATENT DOCUMENTS 2,763,860 A * 9/1956 Ortusi .................... H01Q 15/10 343/753
2,978,702 A * 4/1961 Pakan .................. H01Q 15/244 343/773
3,145,382 A * 8/1964 Cuming ................. H01Q 15/23 165/104.31
3,243,498 A * 3/1966 Allen ..................... H05K 1/115 439/83
3,518,685 A * 6/1970 Jones, Jr. ............... H01Q 1/286 343/785

(Continued)

FOREIGN PATENT DOCUMENTS

CN 114188724 A 3/2022

OTHER PUBLICATIONS

International Search Report and Written Opinion of the International Searching Authority dated Feb. 23, 2024 in connection with International Patent Application No. PCT/US2023/035824, 16 pages.

(Continued)

*Primary Examiner* — Dameon E Levi
*Assistant Examiner* — Jordan E. DeWitt

(57) ABSTRACT

A dielectric encapsulated metal lens includes a planar conductive plate with a first surface and a second surface, wherein the first surface is parallel to the second surface; a plurality of openings from the first surface through the planar conductive plate to the second surface, wherein a longitudinal axis of each opening is perpendicular to the first surface and the second surface, wherein a size of each opening is a function of a position of said each opening on the planar conductive plate; and a dielectric material encapsulating the planar conductive plate and filing the plurality of openings, where the dielectric material forms a top surface and a bottom surface for the metal lens to reduce reflected energy.

20 Claims, 9 Drawing Sheets

(56) References Cited

U.S. PATENT DOCUMENTS 4,150,876 A * 4/1979 Yevick .............. G02F 1/133526 349/110
4,156,878 A 5/1979 Dion
4,321,604 A 3/1982 Ajioka
6,081,239 A * 6/2000 Sabet ................... H01Q 19/062 343/753
9,291,504 B2 * 3/2016 Goldring ............... G01J 3/0208
9,583,840 B1 2/2017 Lawrance
2002/0014996 A1 * 2/2002 Keilen ..................... H01Q 9/42 343/702
2002/0100969 A1 * 8/2002 Farquhar ............. H01L 23/4334 438/126
2003/0030593 A1 * 2/2003 Tomomatsu ............. H01Q 1/40 343/702
2003/0062973 A1 * 4/2003 Endou ....................... H01P 7/04 333/206
2008/0024873 A1 * 1/2008 Kim ....................... G02B 5/008 430/327
2008/0297417 A1 * 12/2008 Austin ..................... H01Q 1/38 343/700 MS
2010/0260460 A1 * 10/2010 Harrysson ................ H01Q 1/38 343/702
2011/0036171 A1 * 2/2011 Maris ................. G01N 29/2418 73/606
2012/0056776 A1 * 3/2012 Shijo .................... H01Q 21/064 342/146
2012/0235872 A1 * 9/2012 Lewis ................ H01Q 21/0037 343/753
2013/0099989 A1 * 4/2013 Pantea ............... H01Q 13/0208 343/783
2015/0168601 A1 * 6/2015 Suzuki ................... G02B 1/002 359/356
2016/0126636 A1 * 5/2016 Uemichi ............ H01Q 21/0043 343/771
2016/0126637 A1 * 5/2016 Uemichi ............ H01Q 21/0043 343/771
2018/0159237 A1 * 6/2018 Crouch ................ H01Q 13/085
2018/0166789 A1 * 6/2018 Galla ..................... H01Q 15/08
2018/0292581 A1 * 10/2018 Shalaev ................. G02B 1/002
2019/0273162 A1 * 9/2019 Misaki ................... H01Q 13/22
2020/0018874 A1 * 1/2020 Chisum .................. H01Q 15/10
2020/0264043 A1 * 8/2020 Allen ................... G02B 5/1876
2021/0135061 A1 * 5/2021 Navabi .................. H05K 1/181
2022/0416433 A1 * 12/2022 Sledkov ................. H01Q 15/10
2023/0198158 A1 * 6/2023 Crouch .................. H01Q 15/10 343/911 R
2023/0228909 A1 * 7/2023 Hanania ................... G02B 3/08 349/200

OTHER PUBLICATIONS

Cheng et al., "Broadband Dual-Polarized Metal Lens With Theoretically Arbitrarily Variable Focal Diameter Ratio Using 3-D Printing Technology," IEE Transactions on Antennas and Propagation, vol. 70, No. 9, Sep. 2022, 12 pages.
Chen et al., "Microwave Metalens Antennas," Proceedings of the IEEE, vol. 111, Issue 8, Aug. 2023, 33 pages.

* cited by examiner 100
102
102A
102B
102C
104
106
5.3"
4.65"
0.3"

702
704
706
706
5.5" OD
20 mil
20 mil
275 mil

DIELECTRIC ENCAPSULATED METAL LENS

CROSS-REFERENCE TO RELATED APPLICATIONS

This patent application is a Continuation-In-Part and claims the benefits of U.S. patent application Ser. No. 17/524,644, filed on Nov. 11, 2021 and entitled "Planar Metal Fresnel Millimeter-Wave Lens," the entire content of which is hereby expressly incorporated by reference.

STATEMENT REGARDING FEDERALLY SPONSORED RESEARCH

This invention disclosure is related to a government contract number HR0011-22-C-0035. The U.S. Government has certain rights to this invention.

FIELD OF THE INVENTION

The disclosure relates generally to metal lenses and more specifically to a dielectric encapsulated metal lens.

BACKGROUND

Millimeter waves are electromagnetic waves having wavelengths between 1 and 10 millimeters and frequencies between 30 and 300 gigahertz (GHz). Millimeter-waves propagate primarily by line-of-sight paths and are being increasingly used in a variety of applications, such as, scientific research (e.g., radio astronomy and remote sensing), telecommunications (including the new generation of 5G cell phone networks), collision avoidance, military/weapon systems, security screening, plasma heating for inertial confinement fusion, material processing, medicine, law enforcement, and the like. In all these applications, there is a need for quasi-optical beam processing elements (such as lenses) that are capable of high average power operation.

Conventional lenses, whether millimeter or optical lens, operate by varying the physical path length over which the incident radiation must traverse to pass through the lens. Existing metal lens designs fall generally into two classes. Parallel-plate metal lenses consist of a number of parallel metal plates that act like waveguides for incident radiation polarized parallel to the plates. The depth of the plates is varied as a function of position relative to the center of the lens to impart the desired shape to incident wave fronts. Perforated plate lenses consist of a uniform array of circular holes/openings; one or both plate surfaces are shaped as a means of varying path length with position. A lens having high-power capability is needed to process high-intensity millimeter beams. However, dielectric lenses have low thermal conductance. Likewise, existing metal lenses require non-planar surfaces, and have added weight and higher insertion loss. Also, the thermal conductance of parallel plate metal lenses is inhibited by the thinness of the plates and the fact that heat is conducted along one direction only.

Accordingly, there is a need for low-loss quasi-optical beam processing elements (such as lenses) capable of high average power operation.

SUMMARY

The present disclosure is directed to dielectric encapsulated metal lenses.

In some embodiments, a dielectric encapsulated metal lens includes a planar conductive plate with a first surface and a second surface, wherein the first surface is parallel to the second surface; a plurality of openings from the first surface through the planar conductive plate to the second surface, wherein a longitudinal axis of each opening is perpendicular to the first surface and the second surface, wherein a size of each opening is a function of a position of said each opening on the planar conductive plate; and a dielectric material encapsulating the planar conductive plate and filling the plurality of openings, wherein the dielectric material forms a top surface and a bottom surface for the metal lens to reduce reflected energy.

In some embodiments, a method of fabricating a dielectric encapsulated metal lens, includes: providing a mold filled with dielectric liquid resin; a plurality of spacers in or integral to the mold or built into the mold; providing a planar metal plate including a plurality of openings; inserting the planar metal perforated plate into the mold filled with dielectric liquid resin to be situated on the spacers to form a dielectric bottom surface for the planar metal plate, the planar metal plate being encapsulated by the dielectric liquid resin and the plurality of openings being filled with the dielectric liquid resin; forming a top dielectric surface on top of the planar metal plate; curing and removing the encapsulated planar metal plate from the mold; and machining to reduce the thickness of the top dielectric surface to form the dielectric encapsulated metal lens.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 8A illustrates a perspective view and FIG. 8B depicts a magnified view.

DETAILED DESCRIPTION

Figures 7A, 7B, 7C:
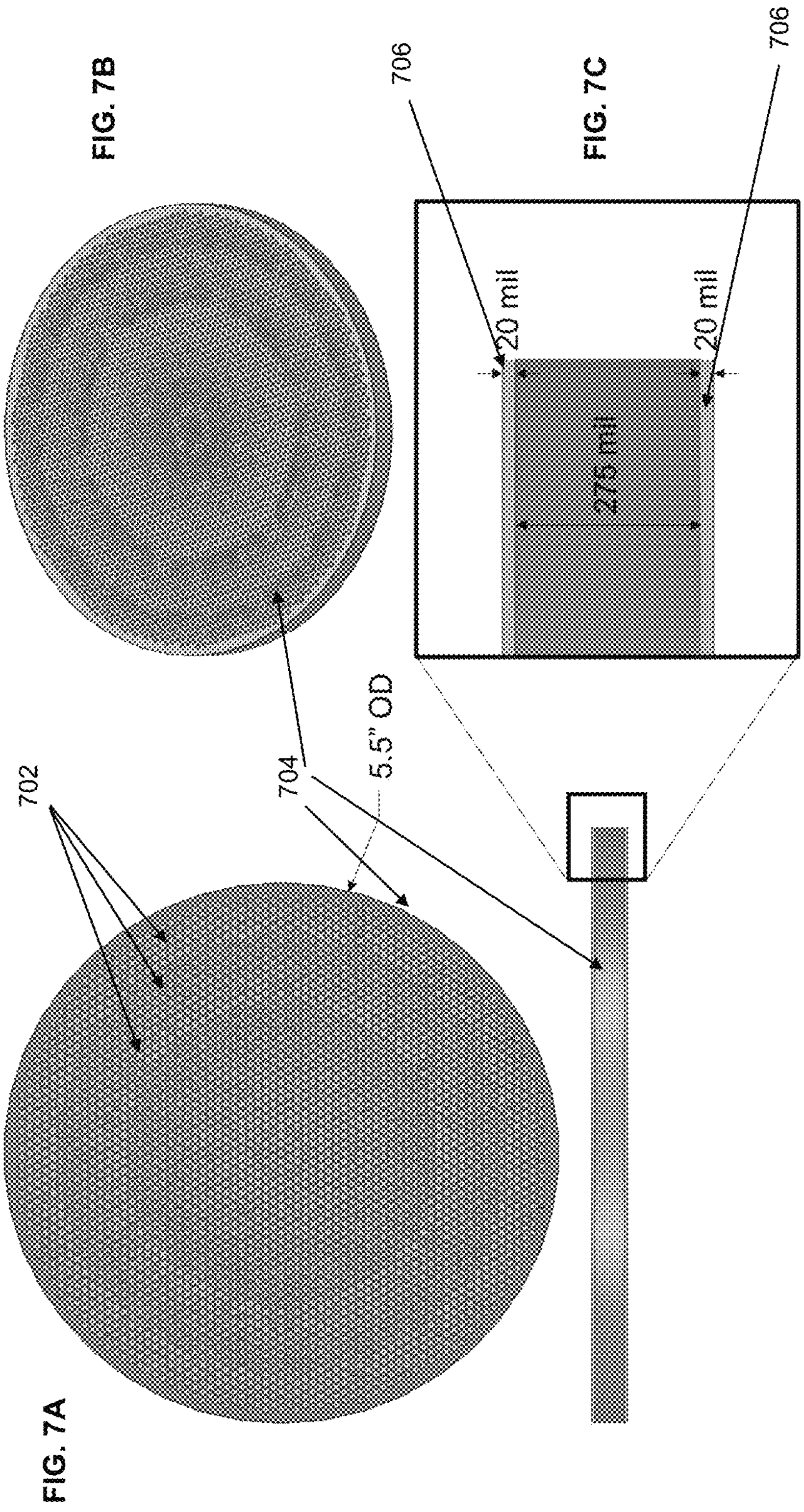
FIGS. 7A, 7B and 7C show a planar dielectric encapsulated metal lens, according to some embodiments of the disclosure.

In some embodiments, the disclosure is directed to a dielectric encapsulated metal lens. FIGS. 7A, 7B and 7C show a planar dielectric encapsulated metal lens, according to some embodiments of the disclosure. FIG. 7A depicts a top view, FIG. 7B shows a perspective view and FIG. 7C illustrates a side view of the dielectric encapsulated metal lens. As shown, the dielectric-encapsulated metal lens has at its core an electrically-conductive perforated plate with a planar architecture and includes an array of cylindrical openings 702 distributed on a uniform equilateral triangular grid pattern. In some embodiments, the electrically-conductive plate may be constructed from aluminum or titanium and the aluminum or titanium plate may be coated with gold to increase its conductivity. A planar perforated conductive plate 704 (e.g., an aluminum plate) is perforated by a periodic array of cylindrical openings (holes) 702 of varying or fixed diameter that are filled with low-loss dielectric material and are distributed on a uniform triangular grid. The longitudinal axis of each opening 702 is perpendicular to the first surface and the second surface. For embodiments designed for operation near 95 GHz, the opening diameters may vary from 55 to 80 mils and the center-to-center spacing may vary from 90 to 100 mils when the dielectric material is polyethylene ($\varepsilon_R$=2.25). The opening arrangement (pattern) and opening shapes may also vary depending on the incident beam, lens size and its application. In some embodiments, the thickness of the metal plate is 275 mils and the surface layers 706 on the top and bottom have a thickness of about 20 mil, as shown in FIG. 7C. The perforated conductive plate 704 provides high strength and high thermal conductance.

Figures 8A, 8B:
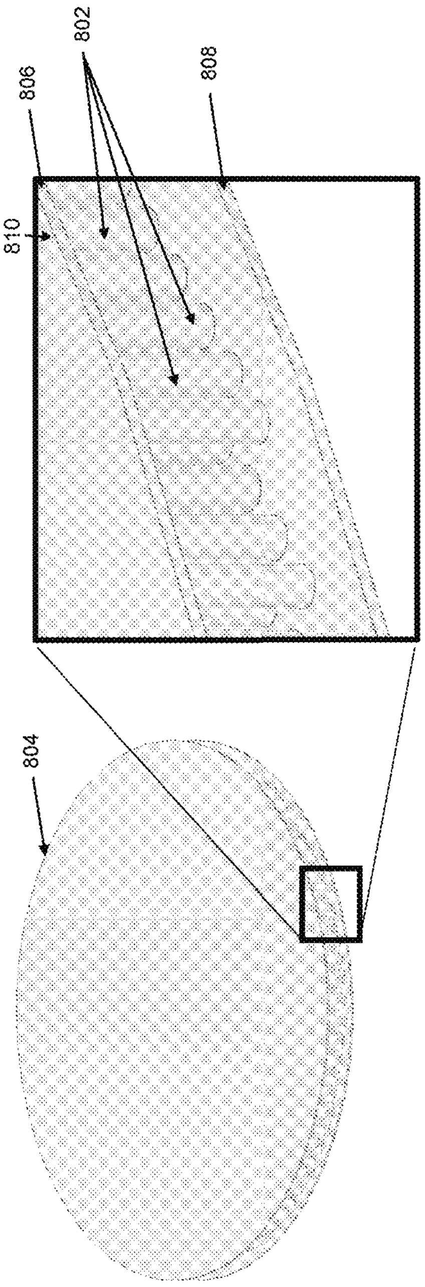
FIGS. 8A and 8B show a dielectric encapsulation of the planar dielectric encapsulated metal lens illustrated in FIGS. 7A, 7B, and 7C.

FIGS. 8A and 8B show a dielectric encapsulation of the planar dielectric encapsulated metal lens illustrated in FIGS. 7A, 7B, and 7C, according to some embodiments of the disclosure. FIG. 8A illustrates a perspective view and FIG. 8B depicts a magnified view. A bare metal (e.g., Aluminum) perforated plate 804 (metal lens) (not visible in FIGS. 8A and 8B) is immersed in a dielectric material to fill in the holes with the dielectric material and encapsulate the dielectric material 804. The holes 802 are completely filled with the dielectric material and the excess dielectric material (beyond filling the holes) forms a top surface layer 806 and a bottom surface layer 808 for forming a dielectric encapsulated metal lens. In some embodiments, the holes 802 are filled with a low-loss dielectric and the top and bottom surface layers 806 and 808 are covered with an impedance-matching layer 810.

This way, the filled holes result in a smaller hole size and reduced hole-to-hole spacing for a given application and result in a finer sampling of incident wavefronts, which then results in improved focusing and higher capture efficiency of the lens. The filled holes also provide environmental barriers. The dielectric encapsulated metal lens also provides a tuning mechanism, yielding improved return loss, that is, the surface layers with approximate $\lambda/4$ thickness improve impedance match, resulting in reduced reflected power. Here, the surface layers serve a purpose similar to anti-reflection coatings in conventional optics.

Focusing is achieved by equalizing the total phase of all rays converging at the focal point, that is, $\Phi(0)=\Phi(r)$ for $0<r\leq R$. Note that the insertion phase $\phi(0)$ at the center of the lens is a free parameter the value of which can be chosen to improve lens performance, e.g., minimize the RMS phase error of the actual insertion phase relative to the ideal phase from Equation (6) below.

Figures 9A, 9B, 9C, 9D:
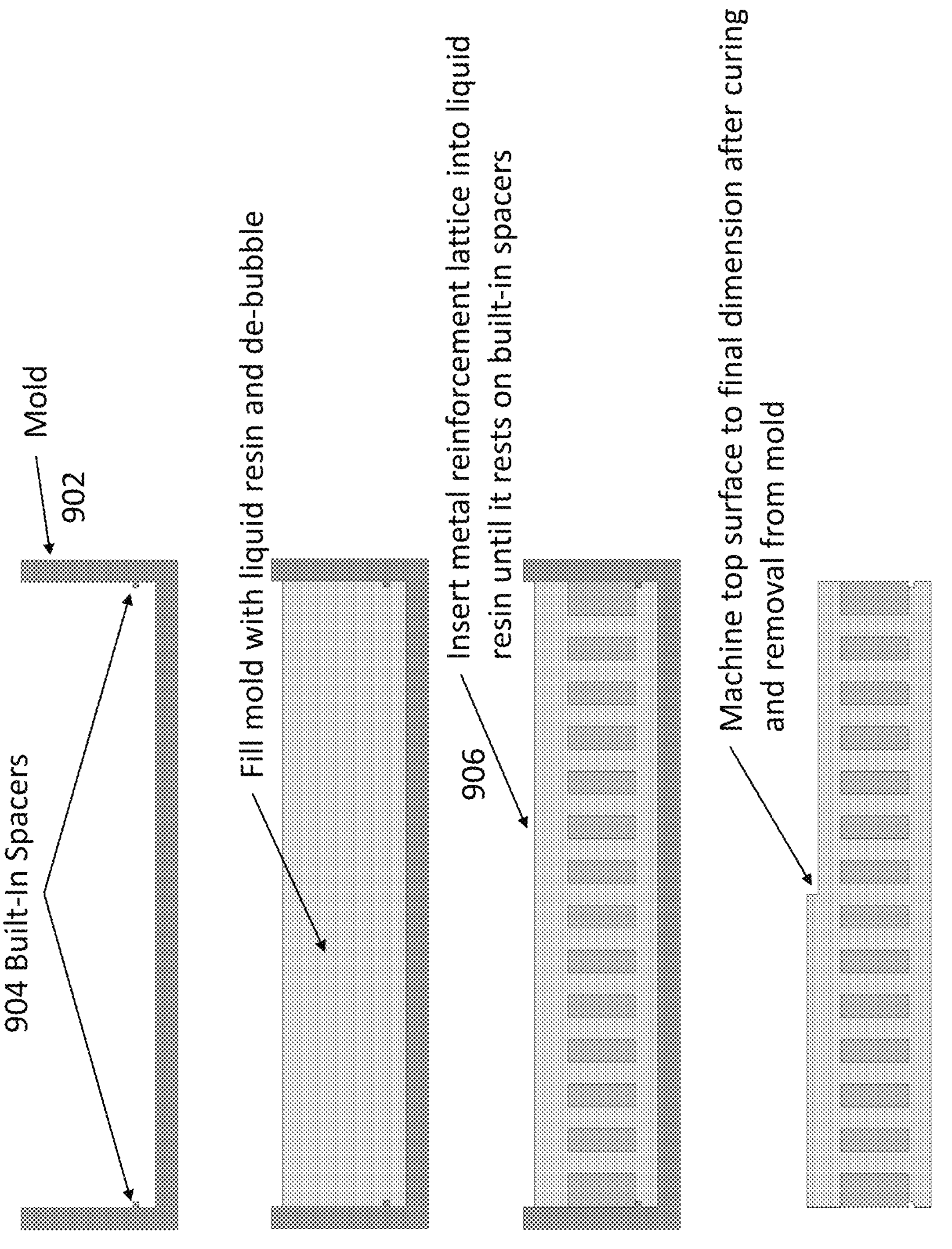
FIGS. 9A, 9B, 9C and 9D show a fabrication method for fabricating a planar dielectric encapsulated metal lens, according to some embodiments of the disclosure.

FIGS. 9A, 9B, 9C and 9D show a fabrication method for fabricating a planar dielectric encapsulated metal lens, according to some embodiments of the disclosure. As shown in FIG. 9A, a mold 902 is provided with one or more built-in spacers 904. The mold 902 is then filled with (low-loss) dielectric material, such as a liquid resin and any bubbles in the resin are removed, as depicted in FIG. 9B. A metal reinforced lattice 906, for example, the bare metal perforated plate 804 of FIG. 8 (metal lens), is inserted into the dielectric resin from the top of the mold. The dielectric material resin fills the perforations (holes) in the metal reinforced lattice 906. The dielectric liquid resin cladding is used to fill the holes and provide surface matching layers. Injection molding can be used to encapsulate the lens in a suitable low-loss polymer. In some embodiments, this reduces hole diameters by a factor of $1/\sqrt{\varepsilon_R}$ (where $\varepsilon_R$ is the relative dielectric constant of the cured dielectric resin) and allowing reduced center-to-center spacing which improves focal-plane performance. The lattice 906 descends (by gravity or an external force) towards the bottom of the mold and comes to rest on top of the spacers 904, as depicted in FIG. 9C. This way, the bottom surface layer (e.g., item 808 in FIG. 8) is formed with the dielectric resin. Also, the top of the lattice, when resting on the spacers 904, is below the surface of the resin in the mold and therefore the additional resin in the mold above the top of the lattice forms the basis for forming the top surface layer (e.g., item 806 in FIG. 8). As illustrated in FIG. 9D, the lattice 906 encapsulated with the dielectric resin is removed from the mold after the dielectric resin is cured. The top surface of the dielectric material on the encapsulated lens is then machined (material is removed from the top surface so that the thickness of dielectric on the top surface has the desired dimension) to form the top surface layer (e.g., item 806, or 706 in FIG. 7).

In some embodiments, the openings (holes) of the planar metal lens may be manufactured by selecting a metal plate with a thickness chosen to yield a suitable (predetermined) insertion phase range, based on the application of the lens. A high-power laser or CNC (computer numerical control) machine tools may then be used to drill the openings of predetermined shape and diameter sizes according to the design parameters of the lens. In some embodiments, the openings may be created by conventional machining, additive manufacturing, chemical machining or electroforming of multiple identical thin metal plates which are diffusion bonded to form a single thicker metal plate. This way, the manufacturing process supports many high-performance metals including aluminum, titanium, stainless steel, and the like with the quality required for critical planar metal millimeter-wave lens applications. Due to the nature of the process, a high degree of control and process capability is possible.

The size of each opening is a function of a position of each opening on the plate such that an insertion phase collectively imposed by the openings on an incident wave causes the incident wave to pass through the first surface and the planar conductive plate and exiting from the second surface to be focused a predetermined distance (F) from the second surface.

Applications at higher millimeter-wave frequencies (e.g., near 100 GHz) require that the dielectric material have a very low loss tangent (e.g., in the ~$5\times10^{-4}$ range). Suitable low-loss polymers include polyethylene (high or low density), polystyrene, polypropylene, Rexolite, and TPX, for these applications. Higher loss materials (e.g., in the ~$5\times10^{-3}$ range) can be used at lower mmW frequencies. In addition to polymers, low-loss resins (e.g., cyanate-ester) present another encapsulation option. Such resins are low-viscosity liquids prior to curing, which may simplify fabrication.

The range of opening diameters and center-to-center spacing are frequency dependent. The illustrative embodiments are designed to operate at 95 GHz; this dictates the smallest opening size and the maximum center-to-center spacing. For circular openings, the smallest opening diameter is determined by the cut-off frequency for dielectric-filled cylindrical waveguide, which is $$f_c = \frac{1.8412c}{2\pi\sqrt{\varepsilon_R}\,a} \tag{1}$$

where c is the speed of light in vacuum, $\varepsilon_R$ is the relative dielectric constant of the dielectric filling the waveguide, and a is the waveguide radius (or in our case the opening radius). Below $f_c$ electromagnetic waves cannot propagate in the waveguide. This equation can be rearranged to determine the minimum possible opening diameter in a lens configuration. If $f_{lens}=f_c=95$ GHz, $$a_{min} = \frac{1.8412c}{2\pi\sqrt{\varepsilon_R}\,f_{lens}} \tag{2}$$

which yields a minimum opening diameter of $2a_{min}=72.86$ mils when the dielectric is air ($\varepsilon_R=1$) and $2a_{min}=48.57$ mils when the dielectric is polyethylene ($\varepsilon_R=2.25$). Incident power is highly attenuated just above cutoff and almost entirely reflected below cutoff.

It is well known that the phase velocity of guided waves propagating in a waveguide varies with waveguide dimensions. Lenses according to the present disclosure leverage this fact by tailoring the insertion phase as a function of position via opening diameter rather than plate thickness. As known, the phase shift per unit length of a wave in free space is given by $$\frac{\omega}{c},$$

where ω is equal to 2πf and c is the speed of light, where f is the frequency.

Accordingly, the phase shift of a beam 210 incident at the center of the lens 206, Φ(0), is given by the following equation (referring to FIG. 2):

$$\Phi(0) = \phi(0) - \frac{\omega}{c}F \tag{4}$$

Similarly, the phase shift of a beam 208 incident at the edge of the lens 206, Φ(R) is given by the following equation (5):

$$\Phi(R) = \phi(R) - \frac{\omega}{c}\sqrt{R^2 + F^2} \tag{5}$$

Focusing is achieved by equalizing the total phase of all rays converging at the focal point, that is, Φ(0)=Φ(r) for 0<r≤R. Note that the insertion phase ϕ(0) at the center of the lens is a free parameter the value of which can be chosen to improve lens performance, e.g., minimize the RMS phase error of the actual insertion phase relative to the ideal phase from Equation (6). Therefore, the design parameters for the planar metal lens that focuses all the incident beams at its focal point in given by:

$$\phi(r) = \phi(0) + \frac{\omega}{c}\left(\sqrt{r^2 + F^2} - F\right) \tag{6}$$

Equation (6) yields the lens insertion phase ϕ as a function of the radial distance r from the lens center required to compensate path length differences from the lens to a focal point a distance F from the lens. The insertion phase (the phase impressed by the lens on the local electromagnetic field in propagating from one side of the lens to the other) impressed by an opening upon the electromagnetic wave propagating through it is tailored by varying the opening diameter as a function of radial distance r from the lens center.

In some embodiments, the disclosure is directed to a planar metal Fresnel millimeter-wave lens. The lens may be disposed in association with a horn antenna, as a quasi-optical element for millimeter beams, to produce a collimated millimeter wave beam. The planar metal Fresnel millimeter-wave lens is a planar conductive plate perforated by a periodic array of cylindrical openings (holes) of varying diameters.

In general, a conventional dielectric Fresnel lens reduces the amount of material required compared to a conventional lens by dividing the lens into a set of concentric annular sections. An ideal Fresnel lens would have an infinite number of sections. In each section, the overall thickness is decreased compared to an equivalent simple lens. This effectively divides the continuous surface of a standard lens into a set of surfaces of the same curvature, with stepwise discontinuities between them. The Fresnel design allows the construction of lenses of large aperture and short focal length without the mass and volume of material that would be required by a lens of conventional design. Fresnel lenses are usually made of glass or plastic.

Figures 1A, 1B, 1C:
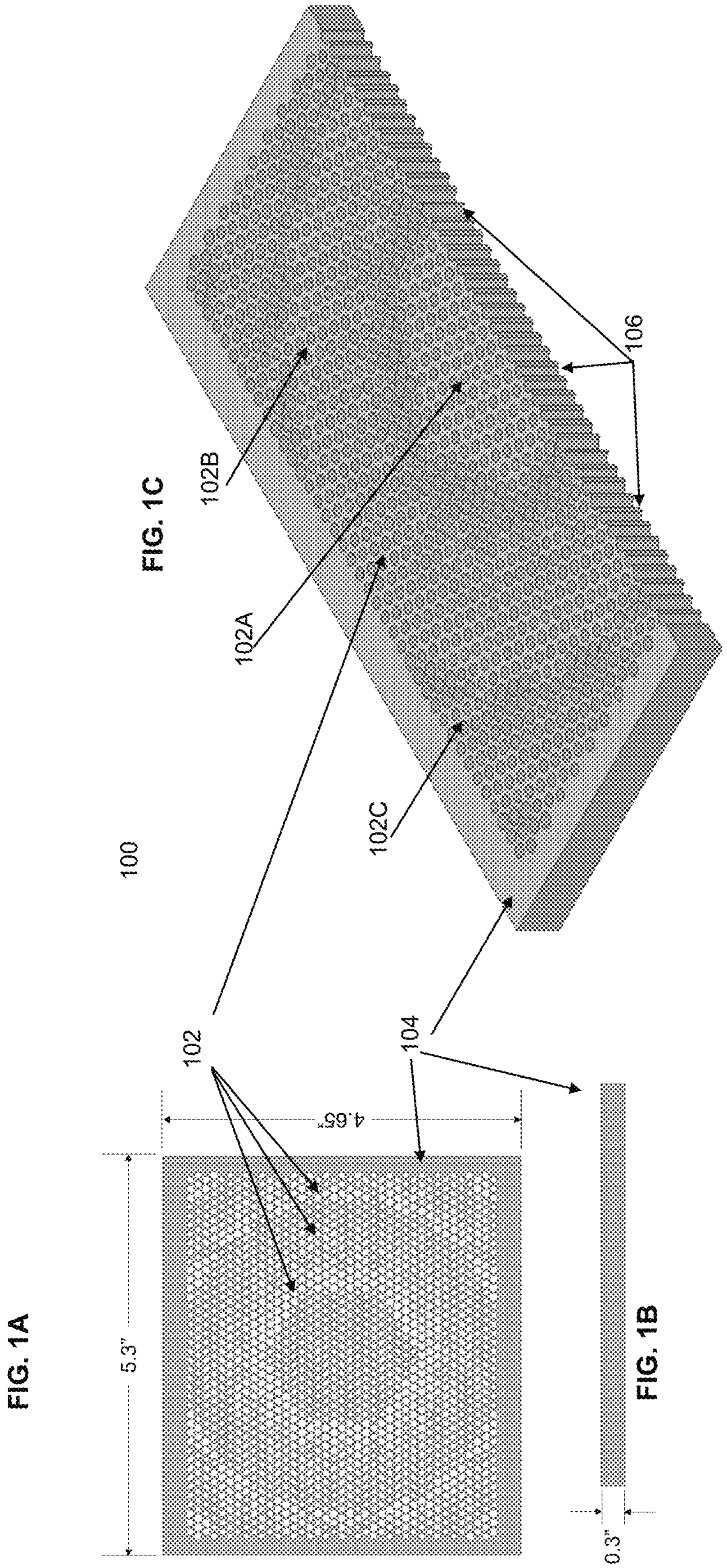
FIG. 1A depicts a top view.
FIG. 1B shows a side view and FIG. 1C illustrates a cutaway perspective view of a planar metal millimeter-wave lens, according to some embodiments of the disclosure.

FIGS. 1A, 1B and 1C show a planar metal Fresnel millimeter-wave lens 100, according to some embodiments of the disclosure. FIG. 1A depicts a top view, FIG. 1B shows a side view and FIG. 1C illustrates a perspective view of the cut-off portion of the lens 100. As shown, the lens has an all-metal lens construction with a planar architecture and includes an array of variable diameter cylindrical openings 102 distributed on a uniform equilateral triangular grid pattern. In some embodiments, the lens may be constructed from aluminum or titanium and the aluminum or titanium plate may be coated with gold to increase its conductivity. A planar conductive plate 104 (e.g., an aluminum plate) is perforated by a periodic array of cylindrical openings 102 of varying diameters. For example, for embodiments designed for operation near 95 GHz, the opening diameters may vary from 74 to 110 mils and the center-to-center spacing may vary from 120 to 130 mils, allowing a minimum 10 mil wall thickness between neighboring holes The opening arrangement (pattern) and opening shapes may also vary depending on the incident beam, lens size and its application.

In some embodiments, the planar conductive plate 104 may be a dielectric material plated with a suitable conductor (e.g., copper, gold, etc.), instead of a planar solid metal plate. The dielectric material is chosen for its mechanical and/or thermal properties rather than its electrical properties, since the plating shields it from incident electromagnetic waves. This approach might be desirable for weight reduction, fabrication cost (it might be more cost effective to form a perforated plate from dielectric than metal, injection-molded plastic, for example).

As for center-to-center spacing, grating lobes may appear if the center-to-center opening spacing is too large. Grating lobes, which are normally associated with phased-array antennas, are secondary beams which are approximately the same amplitude as the main beam. In phased-array applications in which the beam is electronically scanned in azimuth and elevation, the maximum center-to-center spacing is typically one-half wavelength at the maximum operating frequency. However, for the embodiments that do not scan the beam, a larger spacing is tolerable. In some embodiments, an opening spacing of 120 mils is just less than one wavelength for an operating frequency of 95 GHz (124 mil wavelength). However, if the spacing is too large, grating lobes can appear even if the beam is not scanned.

As shown in FIG. 1C, the variable diameter cylindrical openings 102A, 102B and 102C have a cylindrical shape 106 that extend from the top of the plate 104 to its bottom with varying diameters and a uniform triangular grid pattern. For example, as shown in FIGS. 1A and 1B, the openings 102A around the center of the plate 104 have smaller diameters than the openings 102B in the middle of the plate 104. Also, the openings 102C towards the perimeter of the plate 104 may have larger or smaller diameters than the openings 102A or 102B.

Although, the arrangement pattern of the cylindrical openings 102 is shown as an equilateral triangular pattern as an example, the arrangement pattern of each or all of the openings 102A, 102B and 102C may vary from the equilateral triangular pattern and be different from each other. For example, openings 102A may have a rectangular pattern, while openings 102B may have a square pattern and openings 1C may have a circular or triangular pattern, or any combination thereof.

Figure 2:
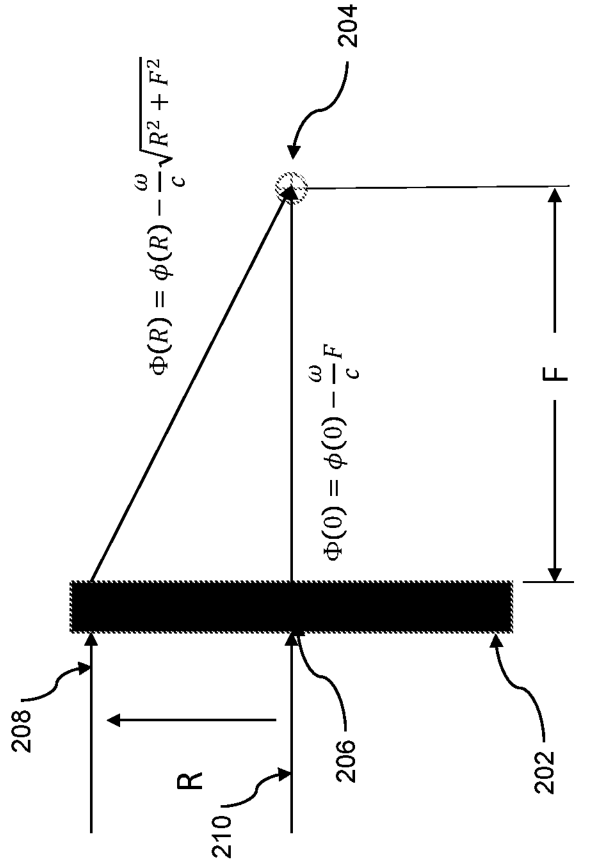
FIG. 2 illustrates schematic of design parameters of a planar metal millimeter-wave lens and a planar dielectric encapsulated metal lens, according to some embodiments of the disclosure.

FIG. 2 depicts a diagram depicting the design parameters of a planar metal millimeter-wave lens and a planar dielectric encapsulated metal lens, according to some embodiments of the disclosure. As shown, the planar metal lens 202 includes a focal point 204 at a distance F from the lens 202, a lens center 206 with a distance from center to the edge of R. $\Phi$ is the total phase shift, where $\Phi(R)$ is the phase shift of a beam 208 incident at the distance R from the center of the lens, $\Phi(0)$ is a phase shift of a beam 210 incident at the center of the lens 206, and $\phi(r)$ is the insertion phase of an opening a distance r from the lens center (where $0<r\leq R$) and is a function of opening size.

Figure 3B:
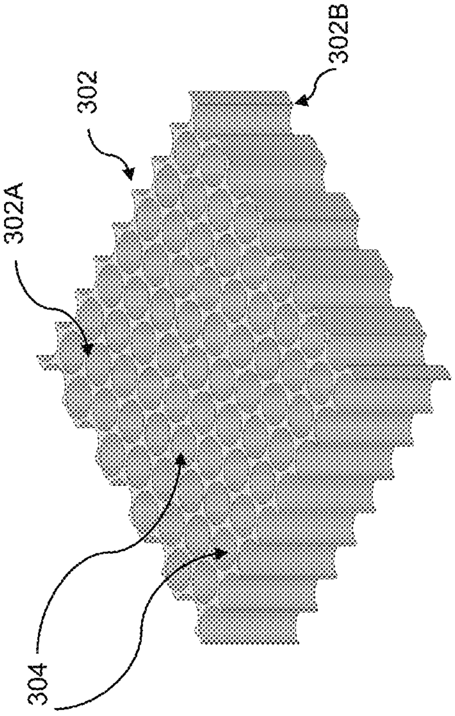
FIGS. 3A and 3B show a planar metal millimeter-wave lens with circular-shaped openings, according to some embodiments of the disclosure.
Figure 3A:
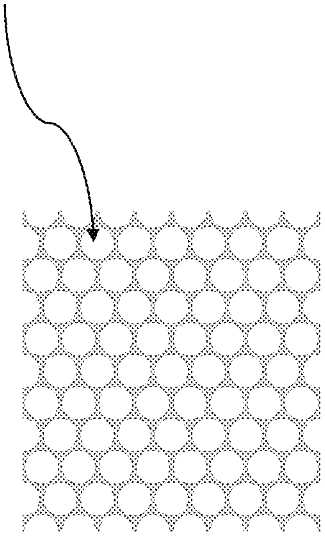

FIGS. 3A and 3B each show a portion of a planar metal millimeter-wave lens with circular-shaped openings, according to some embodiments of the disclosure. FIG. 3A shows a top view and FIG. 3B shows a perspective view. As shown in these embodiments, a planar metal plate 302 has a first (top) surface 302A and a second (bottom) surface 302B. The two surfaces 302A and 302B are parallel to each other. Cylindrical openings 304 are arranged on a uniform equilateral triangular grid (however, they may be in different patterns depending on the design requirements), where the diameters of the openings are determined based on equation (6). The metal plate thickness is chosen to yield suitable insertion phase range based on equation (6).

Figure 4B:
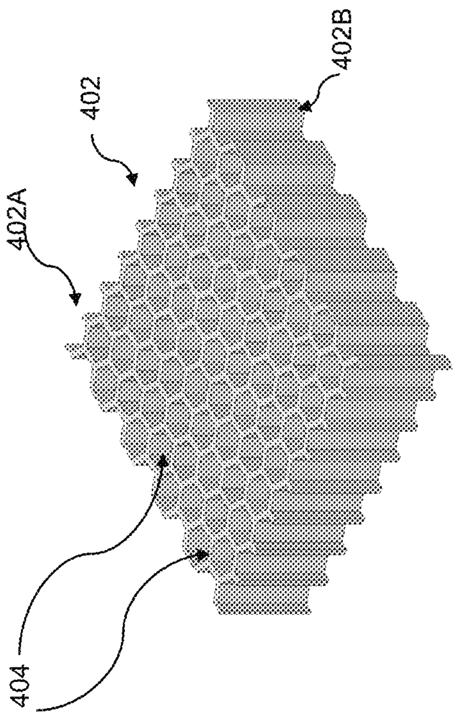
FIGS. 4A and 4B depict a planar metal millimeter-wave lens with hexagonal-shaped openings, according to some embodiments of the disclosure.
Figure 4A:
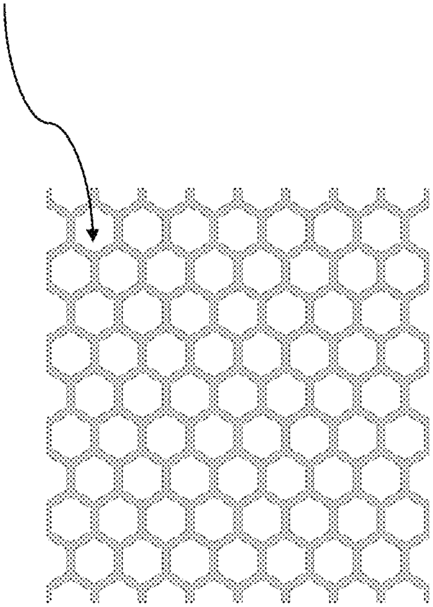

FIGS. 4A and 4B depict a portion of a planar metal millimeter-wave lens with hexagonal-shaped openings, according to some embodiments of the disclosure. FIG. 4A shows a top view and FIG. 4B shows a perspective view of the planar metal lens. As depicted in these embodiments, a planar metal plate 402 has a first (top) surface 402A and a second (bottom) surface 402B. The two surfaces 402A and 402B are parallel to each other. Hexagonal openings 404 are arranged on a uniform equilateral triangular grid (however, they may be in different patterns depending on the design requirements), where the diameters of the openings are determined numerically. The metal plate thickness is chosen to yield suitable insertion phase range based on equation (6).

In these embodiments, the openings are hexagonal rather than cylindrical. With hexagonal openings, an opening having the same cross-sectional area as the maximum-diameter cylindrical openings of FIGS. 3A and 3B may yield a uniform web (i.e., the material separating two adjacent openings) between openings that may be more than 1.5 times as thick as web for cylindrical openings.

Hexagonal-shaped openings allow for a thicker metal web of uniform thickness between openings. For a given opening spacing and openings of the same cross-sectional area, hexagonal openings yield a larger web thickness than the circular openings, a difference which may be significant for larger openings. For example, if the center-to-center opening spacing is 120 mils, circular openings of 110 mils in diameter leave a web that has a minimum thickness of 10 mils. Hexagonal openings of width about 100 mils yields openings having the same cross-sectional area as the 110 mil-diameter circular opening, but a uniform web thickness of more 1.5 times that for circular openings of the same area. Increasing the web thickness increases the stiffness of the plate at its weakest points as well as improving thermal conductance.

In some embodiments, the openings (holes) of the planar metal lens may be manufactured by selecting a metal plate with a thickness chosen to yield a suitable (predetermined) insertion phase range, based on the application of the lens. A high-power laser or CNC (computer numerical control) machine tools may then be used to drill the openings of predetermined shape and diameter sizes according to the design parameters of the lens. In some embodiments, the openings may be created by conventional machining, additive manufacturing, chemical machining or electroforming of multiple identical thin metal plates which are diffusion bonded to form a single thicker metal plate. This way, the manufacturing process supports many high-performance metals including aluminum, titanium, stainless steel, and the like with the quality required for critical planar metal millimeter-wave lens applications. Due to the nature of the process, a high degree of control and process capability is possible.

The size of each opening is a function of a position of each opening on the plate such that an insertion phase collectively imposed by the openings on an incident wave causes the incident wave to pass through the first surface and the planar conductive plate and exiting from the second surface to be focused a predetermined distance (F) from the second surface.

This way, the axis of each opening is perpendicular to the surfaces of the planar conductive plate.

Figure 5:
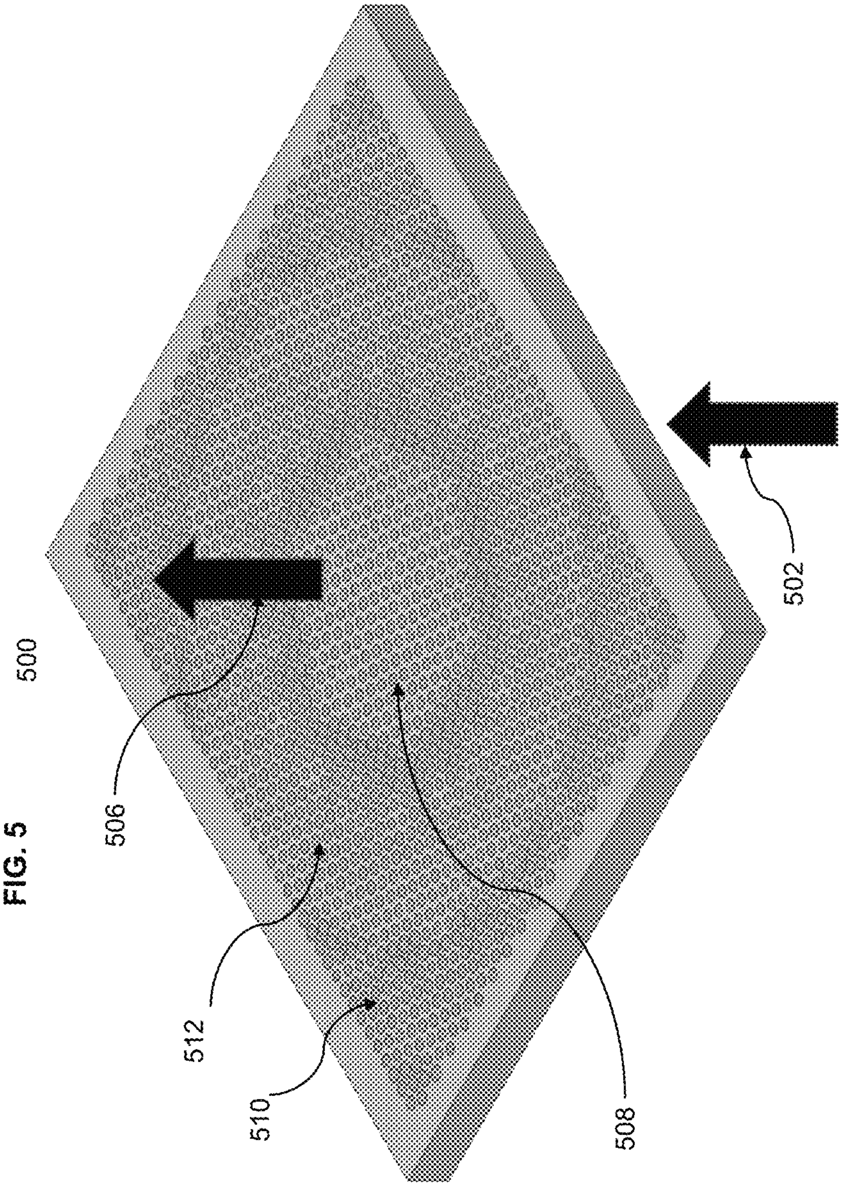
FIG. 5 shows millimeter waves incident on a planar metal millimeter-wave lens, according to some embodiments of the disclosure.

FIG. 5 shows millimeter waves incident on a planar metal millimeter-wave lens, according to some embodiments of the disclosure. As shown, incident millimeter waves 502 enter the planar metal lens 500. The planar metal lens 500 includes a central region 508 with certain opening diameter/ area size and arrangement pattern, an intermediate region 512 with certain opening diameter/area size and arrangement pattern, and a perimeter region 510 with certain opening diameter/area size and arrangement pattern. The opening diameter/area sizes in each region may vary, based on the design parameters, such as, the insertion phase range, as described above. The incident millimeter-wave 502 propagates through the openings, exits the lens as millimeter-wave 506 and is focused on the focal point of lens 500.

Figure 6:
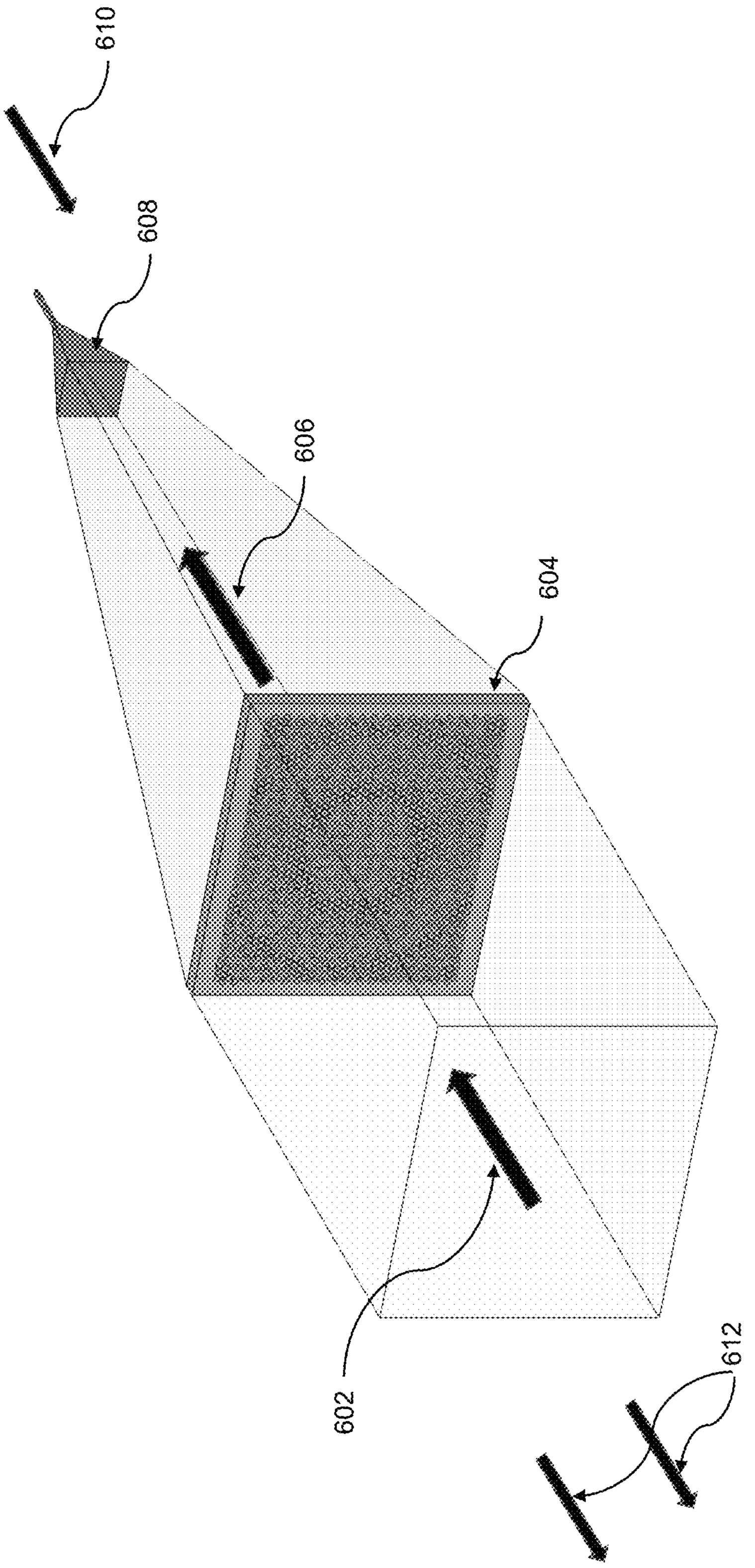
FIG. 6 depicts a planar metal millimeter-wave lens with an antenna configured as a receiving and transmitting lens, according to some embodiments of the disclosure.

FIG. 6 depicts a planar dielectric encapsulated metal lens, or a planar metal Fresnel millimeter-wave lens with an antenna configured as a receiving and transmitting lens, according to some embodiments of the disclosure. The planar dielectric encapsulated metal lens, or the planar metal Fresnel millimeter-wave lens 604 is disposed in association with an antenna 608 (e.g., a horn antenna), as a quasi-optical element for millimeter-waves, to produce a focused or collimated millimeter wave beam.

In a transmit mode, the antenna 608 transmits millimeter waves 610 that illuminate one side of the planar metal lens 604 (the back side in FIG. 6, not visible) to generate a collimated output beam 612 that propagates away from the visible side of the planar metal lens 604, as shown in FIG. 6. In a receive mode the planar metal lens 604 is illuminated by a plane wave or a collimated beam 602 incident on the visible side of the planar metal lens 604. The incident millimeter waves are focused by the lens to a focal point within antenna 608.

The planar construction of the planar metal lens of the present disclosure simplifies fabrication, reduces thickness and complexity of conventional zone-plate designs. Moreover, all-metal construction yields high power handling capability and a low thermal resistance path for absorbed energy. Additionally, the metal lens acts as a protective radome for the aperture, providing armored protection without a performance penalty. In some embodiments, the planar metal/conductive plate may be a dielectric material coated with a suitable conductor (e.g., copper, gold, etc). The dielectric material is chosen for its mechanical and/or thermal properties rather than its electrical properties, since the plating shields it from incident electromagnetic waves.

It will be recognized by those skilled in the art that various modifications may be made to the illustrated and other embodiments of the disclosure described above, without departing from the broad inventive scope thereof. It will be understood therefore that the disclosure is not limited to the particular embodiments or arrangements disclosed, but is rather intended to cover any changes, adaptations or modifications which are within the scope and spirit of the disclosure as defined by the appended claims.

The invention claimed is:

1. A dielectric encapsulated metal lens comprising:

a planar conductive plate with a first surface and a second surface, wherein the planar conductive plate comprises a dielectric material plated with a conductor, and wherein the first surface is parallel to the second surface;

a plurality of openings from the first surface through the planar conductive plate to the second surface, wherein a longitudinal axis of each opening is perpendicular to the first surface and the second surface, wherein a size of each opening is a function of a position of the opening on the planar conductive plate;

a dielectric resin encapsulating the planar conductive plate and filling the plurality of openings, wherein the dielectric resin forms a top surface and a bottom surface for the dielectric encapsulated metal lens to reduce reflected energy;

a first impedance-matching layer covering the top surface; and a second impedance-matching layer covering the bottom surface.

2. The dielectric encapsulated metal lens of claim 1, wherein the openings are arranged in the planar conductive plate in an equilateral triangular pattern.

3. The dielectric encapsulated metal lens of claim 1, wherein the openings are arranged in the planar conductive plate in a rectangular, square, or circular pattern.

4. The dielectric encapsulated metal lens of claim 1, wherein a shape of the plurality of openings is circular.

5. The dielectric encapsulated metal lens of claim 1, wherein a shape of the plurality of openings is hexagonal.

6. The dielectric encapsulated metal lens of claim 1, wherein the dielectric resin is a low-loss resin.

7. The dielectric encapsulated metal lens of claim 1, wherein the dielectric material is injection-molded plastic.

8. The dielectric encapsulated metal lens of claim 1, wherein the conductor comprises at least one of copper and gold.

9. The dielectric encapsulated metal lens of claim 1, wherein the size of each opening is selected such that an insertion phase collectively imposed by the openings on an incident wave causes the incident wave to pass through the first surface and the planar conductive plate, exit from the second surface, and focus on a predetermined distance from the second surface.

10. A method of fabricating a dielectric encapsulated metal lens, the method comprising:

providing a mold filled with a dielectric liquid resin, the mold including a plurality of spacers in or integral to the mold;

providing a metal lens comprising:

a planar conductive plate with a first surface and a second surface, wherein the planar conductive plate comprises a dielectric material plated with a conductor, and wherein the first surface is parallel to the second surface; and a plurality of openings from the first surface through the planar conductive plate to the second surface, wherein a longitudinal axis of each opening is perpendicular to the first surface and the second surface, wherein a size of each opening is a function of a position of the opening on the planar conductive plate;

inserting the metal lens in the mold filled with the dielectric liquid resin to be situated on the spacers to form a dielectric bottom surface, the metal lens being encapsulated by the dielectric liquid resin and the plurality of openings being filled with the dielectric liquid resin;

forming a top dielectric surface on top of the metal lens;

curing the dielectric liquid resin encapsulating the metal lens and removing the cured dielectric resin from the mold;

machining the cured dielectric resin to reduce a thickness of the top dielectric surface to form the dielectric encapsulated metal lens;

covering the top dielectric surface with a first impedance-matching layer; and covering the bottom dielectric surface with a second impedance-matching layer;

wherein the top dielectric surface and the bottom dielectric surface of the dielectric encapsulated metal lens reduce reflected energy.

11. The method of claim 10, wherein the openings are formed by a high-power laser or computer numerical control (CNC) machine tool to drill the openings.

12. The method of claim 10, wherein the openings are formed by additive manufacturing.

13. The method of claim 10, wherein the dielectric material is injection-molded plastic, and the openings are formed by the injection-molding of the plastic.

14. The method of claim 10, wherein the conductor comprises at least one of copper and gold.

15. The method of claim 10, wherein the openings are arranged in an equilateral triangular, rectangular, square, or circular pattern.

16. The method of claim 10, wherein a shape of the plurality of openings is circular.

17. The method of claim 10, wherein a shape of the plurality of openings is hexagonal.

18. The method of claim 10, wherein the size of each opening is selected such that an insertion phase collectively imposed by the openings on an incident wave causes the incident wave to pass through the first surface and the planar conductive plate, exit from the second surface, and focus on a predetermined distance from the second surface.

19. The dielectric encapsulated metal lens of claim 1, wherein the dielectric resin is cyanate-ester.

20. The method of claim 10, wherein the dielectric liquid resin is cyanate-ester.

* * * * *